Patented Oct. 22, 1940

2,218,640

UNITED STATES PATENT OFFICE 2,218,640

PRODUCTION OF ALIPHATIC HYDROCARBONS OF THE DIOLEFIN SERIES

Wilhelm Friedrichsen, Ludwigshafen-on-the-Rhine, and Wilhelm Fitzky, Frankfort-on-the-Main-Unterliederbach, Germany, assignors, by mesne assignments, to General Aniline & Film Corporation, New York, N. Y., a corporation of Delaware No Drawing. Application November 18, 1939, Serial No. 305,168. In Germany December 7, 1938

5 Claims. (Cl. 260—681)

The present invention relates to the production of aliphatic hydrocarbons of the diolefin series.

We have found that aliphatic diolefinic hydrocarbons having conjugated double linkages are obtained in a simple manner by contacting 1.3-dioxanes wherein at least one of the carbon atoms in 4- and 5-position is substituted by at most one alkyl radicle, the remaining nuclear carbon atoms being unsubstituted, in the gas phase at elevated temperature with solid catalysts having the effect of splitting off water. The reaction may be illustrated by the following equation:

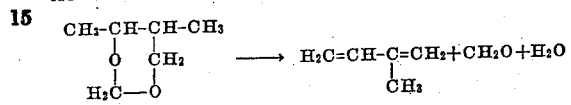

The starting materials correspond to the formula

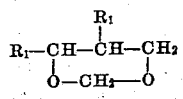

wherein at least one $R_1$ represents an aliphatic hydrocarbon radicle, the other being hydrogen.

They may be prepared from propylene or from its alkyl substitution products unsubstituted in the carbon atoms which are connected by the olefinic linkage, i. e., hydrocarbons corresponding to the formula $R_2$—$CH_2$—$CH=CH$—$R_2$, wherein at least one $R_2$ represents an alkyl radicle, the other being hydrogen, such as α-butylene or β-butylene, by the action of formaldehyde in the presence of an acid catalyst. This reaction is preferably carried out in an inert solvent, such as water, benzene, toluene or halogen hydrocarbons, such as methylene chloride or dichlorethylene at temperatures between room temperature and about 150° C. Suitable acid catalysts are in particular mineral acids, such as hydrochloric acid, phosphoric acid or sulfuric acid, or acid reacting salts such as zinc chloride. The formation of the dioxanes may be explained according to the following equation:

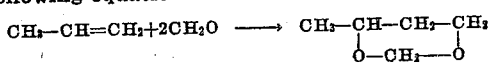

These compounds may also be defined as cyclic acetals of formaldehyde.

As catalysts splitting off water from these 1.3-dioxanes (or cyclic formaldehyde acetals) there may be mentioned in particular those which have proved suitable for the preparation of unsaturated hydrocarbons from alcohols. These are especially phosphoric acid salt catalysts having an acid reaction under dehydrating conditions as for example salts of oxygen acids of phosphorus in the form of the catalysts proposed in the U. S. Patent No. 1,841,055 and also acid salts of various phosphoric acids and also neutral salts which exert an acid reaction under dehydration conditions. Other dehydration catalysts, such as silicic acid gel, aluminium oxide or postassium aluminium sulfate may be used. The catalysts may be employed either with or without conventional carriers, such as pumice stone or graphite. It will be understood that the specific catalyst is not an essential part of the present invention but that we contemplate the use of any of the conventional catalysts employed in the dehydration of alcohols to olefines.

In our process of preparing diolefines, the 1.3-dioxanes are subjected to vaporization and the vapours are preferably admixed with inert diluent gases, such as nitrogen or steam or a mixture of such gases in a suitable ratio. The catalyst is supported in a convenient tube or a plurality of tubes of conventional design which are provided with means for heating the catalyst to dehydrating temperature.

In general, the temperature employed to produce diolefines according to our invention should be within the range of approximately 150 to 450° C., preferably between 200 and 300° C. At materially lower temperatures than these the reaction is unduly slowed up, at least with most catalysts, although it is conceivable that with more reactive catalysts than now available lower temperatures might be employed. Materially higher temperatures are unnecessary. In no event should the temperature be so high as to cause excessive decomposition of the raw material or of the reaction product.

The time of contact between the vaporized starting material and the catalyst may vary over a considerable range without materially affecting the results obtained. In general, the time of contact should be sufficient to insure that a substantial amount of the dioxane initially introduced is subjected to conversion before emerging from the catalyst. The reaction may be carried out under reduced pressure, especially when working in the absence of a diluent gas. Superatmospheric pressure may also be employed.

For each molecule of the dioxane converted one molecule of water and one molecule of formaldehyde are formed. The recovery of the diolefin from these by-products and unchanged initial material may be effected by partial condensation and fractional distillation.

The process, as thus described, is highly satisfactory from a technical point of view for the preparation of diolefins because the primary material is a hydrocarbon which contains one carbon atom less than the diolefin to be produced.

By the present invention new starting materials are made available for the preparation of diolefins.

The following examples will further illustrate how our invention may be carried out in practice, but these examples are merely given for purposes of illustration, and numerous modifications may be made therein without departure from the spirit of our invention.

Example 1

100 grams of zinc chloride dissolved in 200 grams of water are mixed in an autoclave with 300 grams of para-formaldehyde, 800 grams of methylene chloride, and 250 grams of propylene are introduced under pressure. The vessel is maintained while stirring, for 12 hours at about 120° C. After cooling, the excess of propylene is blown off and the methylene chloride solution is separated into its constituents by fractionation. The 4-methyl-1.3-dioxane (butylene glycol formal) boiling between 112° and 117° C. is obtained in the first runnings.

100 grams of this compound are vaporized together with 200 grams of water and led through a tube heated to 270° C. The tube is charged with a phosphoric acid catalyst of the kind described in Example 3 of specification No. 1,841,055. The vapours leaving the tube are separated into readily volatile constituents, water containing the formaldehyde split off and unchanged initial material which may again be used. The readily volatile constituents are condensed and distilled. Butadiene is thus obtained in a yield of 52 per cent besides propylene.

Example 2

100 grams of vaporized 4.5-dimethyl-1.3-dioxane (prepared in the manner described in Example 1 from formaldehyde and butene-2) are led together with 200 grams of steam and at 300° C. over a catalyst of the type described in Example 3 of specification No. 1,841,055. When working up the reaction products in the manner described in Example 1, 29 grams of isoprene together with small amounts of butene-2 are obtained.

Example 3

100 grams of 4-methyl-1.3-dioxane are vaporized and admixed with about the same amount of nitrogen containing 10 per cent of steam. The mixture is led at a pressure of about 240 millimeters (mercury gauge) over potassium ammonium aluminium sulfate (see German Patent No. 507,995) heated to from 270 to 290° C. The vapours emerging from the catalyst are cooled to condense water, formaldehyde and unchanged initial material. The remaining gases are cooled with a low freezing mixture thereby liquefying the butadiene formed.

What we claim is:

1. A process for the manufacture of aliphatic hydrocarbons containing conjugated double linkages which consists in contacting a 1.3-dioxane wherein at least one of the carbon atoms in 4- and 5-position is substituted by at most one alkyl radicle, the remaining nuclear carbon atoms being free from substituents in the gas phase at temperatures between about 150° and 450° C. with a solid dehydration catalyst.

2. A process for the manufacture of aliphatic hydrocarbons containing conjugated double linkages which consists in contacting a 1.3-dioxane wherein at least one of the carbon atoms in 4- and 5-position is substituted by at most one alkyl radicle, the remaining nuclear carbon atoms being free from substituents together with steam in the gas phase at temperatures between about 150° and 450° C. with a solid dehydration catalyst.

3. A process for the manufacture of aliphatic hydrocarbons containing conjugated double linkages which consists in contacting a 1.3-dioxane wherein at least one of the carbon atoms in 4- and 5-position is substituted by at most one alkyl radicle, the remaining nuclear carbon atoms being free from substituents, together with steam in the gas phase at temperatures between about 150° and 450° C. with a solid dehydration catalyst, comprising a salt of an oxygen acid of phosphorus having an acid reaction under dehydration conditions.

4. A process for the manufacture of 1.3-butadiene which consists in contacting 4-methyl-1.3-dioxane together with steam in the gas phase at temperatures between about 150° and 450° C. with a solid dehydration catalyst, comprising a salt of an oxygen acid of phosphorus having an acid reaction under dehydration conditions.

5. A process for the manufacture of 1.3-butadiene which consists in contacting 4-methyl-1.3-dioxane together with steam in the gas phase at temperatures between about 150° and 450° C. with a solid dehydration catalyst consisting of phosphoric acid, graphite and primary sodium phosphate.

WILHELM FRIEDRICHSEN.
WILHELM FITZKY.